United States Patent
Huh et al.

(10) Patent No.: US 9,793,946 B2
(45) Date of Patent: Oct. 17, 2017

(54) RAKE RECEIVER AND RECEIVING METHOD THEREOF

(71) Applicant: LG ELECTRONICS INC., Seoul (KR)

(72) Inventors: Joongkwan Huh, Seoul (KR);
Jaewook Song, Seoul (KR);
Hyungsung Jung, Seoul (KR);
Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/322,706

(22) PCT Filed: Nov. 27, 2014

(86) PCT No.: PCT/KR2014/011461
§ 371 (c)(1),
(2) Date: Dec. 28, 2016

(87) PCT Pub. No.: WO2016/084998
PCT Pub. Date: Jun. 2, 2016

(65) Prior Publication Data
US 2017/0155422 A1 Jun. 1, 2017

(51) Int. Cl.
*H04B 1/10* (2006.01)
*H04B 1/7115* (2011.01)
(52) U.S. Cl.
CPC ......... *H04B 1/7115* (2013.01); *H04B 1/1081* (2013.01)
(58) Field of Classification Search
CPC .................................................. H04B 1/7115
(Continued)

(56) References Cited

U.S. PATENT DOCUMENTS 5,654,979 A * 8/1997 Levin .................. H04B 7/2628
370/342
6,269,075 B1 7/2001 Tran
(Continued)

FOREIGN PATENT DOCUMENTS

| JP | 11-261528 A | 9/1999 |
| KR | 1020030081503 A | 10/2003 |
| KR | 1020080076414 A | 8/2008 |

OTHER PUBLICATIONS

PCT International Application No. PCT/KR2014/011461, International Search Report dated Aug. 25, 2015, 2 pages.

*Primary Examiner* — Sanh Phu
(74) *Attorney, Agent, or Firm* — Lee Hong Degerman Kang Waimey

(57) ABSTRACT

A disclosure of the present specification provides a rake receiver. The rake receiver may comprise: an oscillator; a radio frequency integrated circuit (RFIC) for processing analog signals, which are received after experiencing multipath propagation, according to a sampling clock generated by the oscillator and a carrier frequency clock; a rake processing unit for allocating fingers for each path to signals output from the RFIC, and then performing decoding, wherein the rake processing unit outputs information on a timing position through time tracking, a power metric sampled on-time, and the difference between a power metric at a half chip early-time and a power metric at a half chip late-time; and an auto frequency controller (AFC) for calculating a beta ($\beta$) value for adjusting the sampling clock of the oscillator according to the ratio of the difference between the power metric at the half chip early-time and the power metric at the half chip late-time to the power metric sampled on-time.

10 Claims, 6 Drawing Sheets

(58) Field of Classification Search
USPC .......................................................... 455/296
See application file for complete search history.

(56) References Cited

U.S. PATENT DOCUMENTS

| | | | | |
|---|---|---|---|---|
| 6,456,648 | B1* | 9/2002 | Bultan | H04B 1/7085 |
| | | | | 375/148 |
| 6,771,692 | B2* | 8/2004 | Rick | H04B 1/7085 |
| | | | | 375/148 |
| 6,810,071 | B2* | 10/2004 | Jung | H04B 1/7085 |
| | | | | 370/320 |
| 7,397,784 | B2* | 7/2008 | Ryu | H04B 1/7085 |
| | | | | 370/335 |
| 7,639,766 | B2* | 12/2009 | Wei | H03J 7/02 |
| | | | | 375/279 |
| 2002/0150186 | A1 | 10/2002 | Sendonaris | |
| 2004/0029609 | A1* | 2/2004 | Li | H04B 1/7085 |
| | | | | 455/550.1 |
| 2006/0045171 | A1* | 3/2006 | Ryu | H04B 1/7117 |
| | | | | 375/148 |
| 2006/0072650 | A1 | 4/2006 | Kent et al. | |
| 2006/0098719 | A1* | 5/2006 | Baltersee | H04B 1/7085 |
| | | | | 375/148 |
| 2011/0002366 | A1 | 1/2011 | Michaels et al. | |

* cited by examiner

RAKE RECEIVER AND RECEIVING METHOD THEREOF

CROSS-REFERENCE TO RELATED APPLICATIONS

This application is the National Stage filing under 35 U.S.C. 371 of International Application No. PCT/KR2014/011461, filed on Nov. 27, 2014, the contents of which are hereby incorporated by reference herein in their entirety.

BACKGROUND OF THE INVENTION

Field of the Invention

The present invention relates to a terminal for a mobile communication.

Related Art

Mobile communication technologies has evolved through 2G and 3G into 4G.

FIG. 1 illustrates a mobile communication system.

As illustrated in FIG. 1, a mobile communication system includes at least one base station (BS) 20. Each base station 20 provides a service to terminals 10 existing in specific geographic areas (which are, in general, called cells) 20a, 20b, and 20c.

The advancement of mobile communication technologies has enabled data to be wirelessly transmitted and received at high speeds.

Further more, the terminals 100 goes beyond a regular phone which provides only a phone-call function, and has evolved into a smart phone which provides various functions, therefore improving User Experience (UE).

Meanwhile, many efforts have been being made recently to study and research a Machine Type communication (MTC) or an Internet of Things (IoT) which enables communication between devices and devices or between a device and a server without human intervention. The MIC or the IoT is a concept of communication by a machine device, other than a terminal used by a human, over a wireless communication network. Such an MTC or IoT can be used in various fields, such as tracking, metering, payment, medical industries, and remote control techniques.

A device for the MTC or the IOT transmits a small amount of data, and sometimes needs to transmit and receive uplink/downlink data.

Considering the above characteristics, Wideband Code Division Multiple Access (WCDMA), which is the 3G mobile communication, may be used for the MTC or the IoT and reduce the costs of the device and battery power consumption.

One of the important characteristics of Code Division Multiple Access (CDMA), on which the WCDMA is based, is a rake reception function. The rake reception function is a function of separating two signals according to time delay, the signals which are transmitted at the same time from a base station but arrive a receiver at a different points in time (that is, with phase difference) due to multi-path fading. For this reason, time synchronization is critical for the rake reception function. If a timing offset occurs due to asynchronous time, it may result in degradation of performance.

Accordingly, a WCDMA receiver performs oversampling in order to reduce a timing offset. However, if a timing offset of ⅛ chip occurs when four-times oversampling is performed, it is not possible to compensate for it. To reduce the timing offset of ⅛ to ½ chip, it may be possible to increase the oversampling rate twice to perform 8-times oversampling, but it could also increase complexity considerably. In addition, even when 8-times oversampling is performed, it is still not possible to overcome a timing offset of 1/16 chip.

In sum, increasing an oversampling rate results in an increase in complexity and memory usage. Thus, it is not a perfect solution and fails to overcome a timing offset 1/(an oversampling rate*2).

SUMMARY OF THE INVENTION

Accordingly, an object of the present invention is to solve the above-mentioned problems.

To accomplish the aforementioned object, the present invention provides a configuration of a receiver which is capable of reducing a timing offset without performing oversampling. In particular, the configuration of a receiver according to the present invention makes an oscillator to be controlled based on information on a timing position, thereby preventing degradation of performance by the timing offset.

In an aspect, the present invention provides a rake receiver including: an oscillator; a radio frequency integrated circuit (RFIC) configured to process analog signals, which are received after experiencing multipath propagation, according to a sampling clock and a carrier frequency clock of the oscillator; a rake processing unit configured to allocate a finger for each path of signals output from the RFIC, perform decoding, and output information on a timing position through time-tracking, a power metric sampled on time, and a difference between a power metric at a half chip early-time and a power metric at a half chip late-time; and an auto frequency controller (AFC) configured to calculate a beta ($\beta$) value for adjusting the sampling clock of the oscillator according to a ratio of the difference between the power metric at the half chip early-time and the power metric at the half chip late-time to the power metric sampled on time.

In another aspect, the present invention provides a receiving method of a rake receiver, comprising: processing analog signals, which are received after experiencing multipath propagation, according to a sampling clock and a carrier frequency clock of an oscillator; outputting information on a timing position through time tracking based on of the signals, a power metric sampled on time, and a difference between a power metric at a half chip early-time and a power metric at a half chip late-time; calculating a beta ($\beta$) value based on a ratio of the difference of the power metric at a half-time early time and the power metric at a half-time late time to the power metric sampled at on time; and adjusting the sampling clock of the oscillator based on the beta ($\beta$) value.

According to the present invention, it is possible to reduce a timing offset without performing oversampling, thereby reducing complexity further than a case where oversampling is performed. In particular, according to the present invention, by controlling an oscillator based on information on a timing location, it is possible to prevent degradation of performance by the timing offset.

DESCRIPTION OF EXEMPLARY EMBODIMENTS

Figure 1:
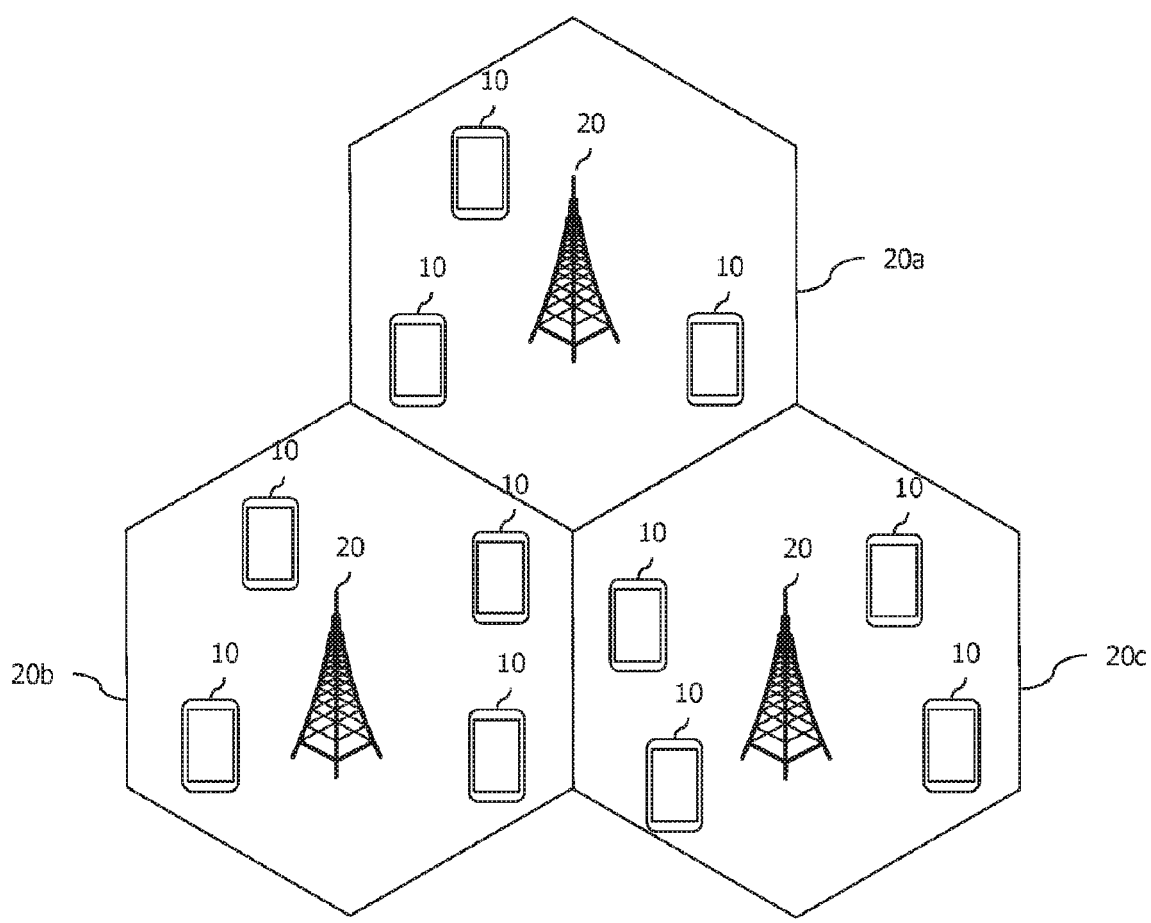
FIG. 1 is a diagram illustrating a mobile communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, mobile terminal (MT), user equipment (UE), a mobile equipment (ME), mobile station (MS), user terminal (UT), subscriber station (ST), handheld device, access terminal (AT) and etc.

As used herein, 'base station' generally refers to a fixed station that communicates with a wireless device and may be denoted by other terms such as eNB (evolved-NodeB), BTS (base transceiver system), or access point.

Figure 2:
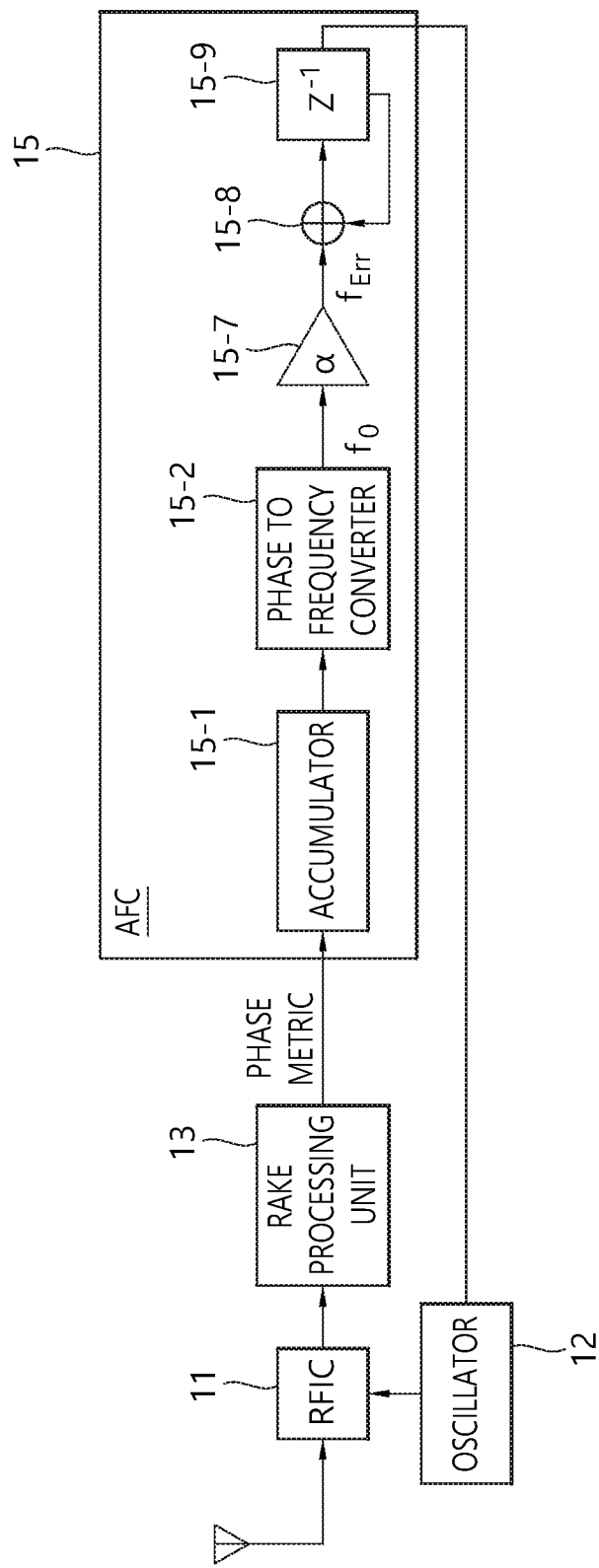
FIG. 2 is a diagram illustrating the configuration of a general Radio Frequency (RF) unit.

FIG. 2 is a diagram illustrating a configuration of a general Radio Frequency (RF) unit.

As illustrated in FIG. 2, a general rake receiver may include a radio frequency integrated circuit (RFIC) 11, an oscillator 12, a rake processing unit 13, and an auto frequency controller (AFC) 15.

The AFC 15 includes an accumulator 15-1, a phase-to-frequency converter 15-2, an alpha ($\alpha$) processing unit 15-7, an adder 15-8, and a delay unit (Z-1) 15-9. The AFC 15 measures difference between its frequency and a frequency of a transmitter, and controls the oscillator 12 so as to reduce the frequency difference.

Meanwhile, if a clock rate of the oscillator 12 is altered by the AFC 15, it may affect a sampling clock so that it may result in a situation which is perceived as if even a timing position has been also moved. The inventor of the present invention has paid attention on this situation.

As a result, the inventor of the present invention controls an oscillator with an offset value, which is capable of utilizing the above situation, to send a timing position in a direction where the maximum signal-to-noise ratio (SNR) is obtainable.

That is, according to an embodiment of the present invention, in an attempt to overcome drawbacks of a general rake receiver and improve performance, an oscillator is controlled to move a timing position to a position where the maximum signal-to-noise ratio (SNR) is obtainable, thereby minimizing degradation of performance by a timing offset.

Figure 3:
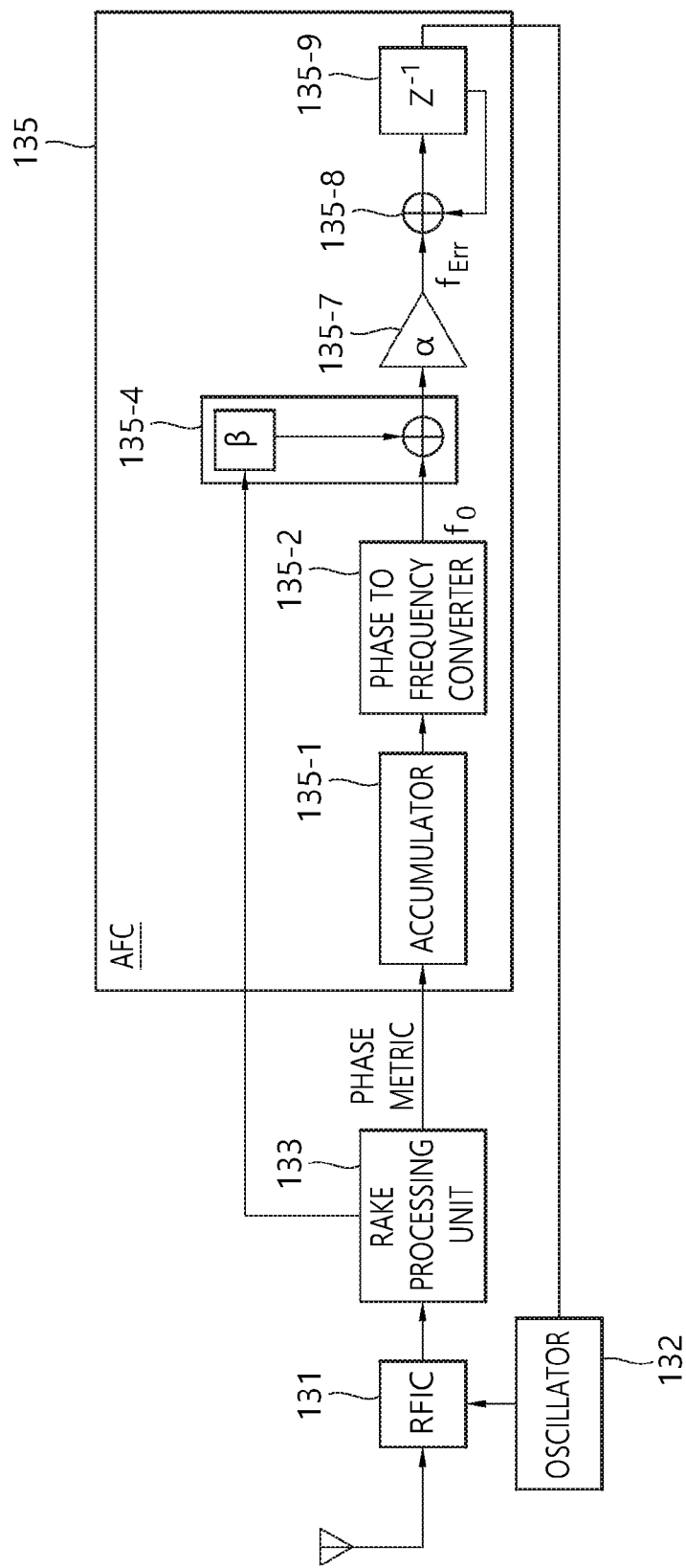
FIG. 3 is a diagram illustrating the configuration of an RF unit according to an embodiment of the present invention.
Figure 4:
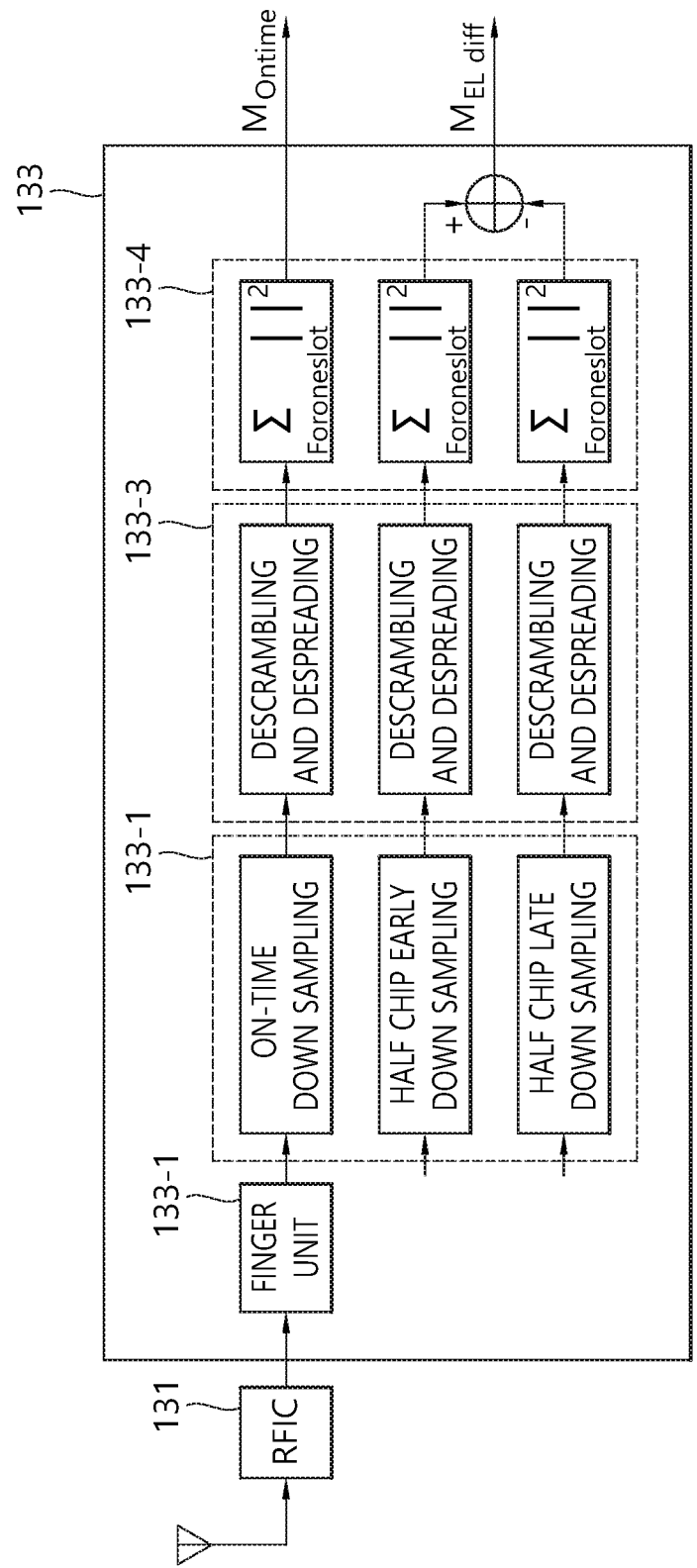
FIG. 4 is a diagram illustrating detailed configuration of a rake processing unit shown in FIG. 3.

FIG. 3 is a diagram illustrating a configuration of an RF unit according to an embodiment of the present invention, and FIG. 4 is a diagram illustrating a detailed configuration of a rake processing unit shown in FIG. 3

As illustrated in FIG. 3, a rake receiver according to an embodiment of the present invention may include a radio frequency integrated circuit (RFIC) 131, an oscillator 132, a rake processing unit 133, an AFC 135.

The RFIC 131 receives analog signals which are received after experiencing multipath propagation. To this end, the RFIC 131 obtains a sampling clock and a carrier frequency clock from the oscillator 132.

The rake processing unit 133 allocates a finger to each path of signals received through the multiple path, and then performs decoding for each signal. The rake processing unit 133 estimates a phase metric through the operation of allocating fingers, and transmits the estimated phase metric to the AFC 135. In addition, the rake processing unit 133 obtains information on a timing position by performing time tracking.

The AFC 135 measures frequency difference with respect to the transmitter, and controls the oscillator 132 to reduce the frequency difference. the AFC 135 includes an accumulator 135-1, a phase-to-frequency converter 135-2, a beta (β) processing unit 135-4, an alpha (α) processing unit 135-7, an adder 15-8, and a delay unit (Z-1) 135-9.

The accumulator 135-1 accumulates a phase matric, transferred from the rake processing unit 133, for a predetermined period of time. The phase-to-frequency converter 135-2 calculates a frequency offset using the accumulated phase metric. To this end, the phase-to-frequency converter 135-2 may utilize an arc tangent function.

The beta (β) processing unit 135-4 acquires information on a timing position from the rake processing unit 133, and obtains a beta (β) value which matches the information on the timing position.

To determine the beta (β) value, it is necessary to acquire the information on a timing position from the rake processing unit 133, as described above. To this end, the rake processing unit 133 may have an improved configuration as shown in FIG. 4.

As illustrated in FIG. 4, the rake processing unit 133 may include a finger unit 133-1, a plurality of down sampling units 133-2, a plurality of descrambling and despreading unit 133-3, a plurality of matching filters 133-4.

The plurality of down sampling units 133-2 includes an on-time down sampling unit configured to perform sampling on time, a half chip early down sampling unit configured to perform sampling at a half chip early time, and a half chip late down sampling unit configured to perform sampling at a half chip late time.

Thus, the rake processing unit 133 calculates a ratio according to the following Equation 1.

$$\frac{M_{EL\_diff}}{M_{Ontime}} \quad \text{[Equation 1]}$$

In the above, Montime denotes a power matric sampled on time, and Montime denotes a difference between a power metric at a half chip early time and a power metric at a half chip late time with reference to a power metric of on time. Thus, Montime is MEL_diff=(Mearly−Mlate), wherein Mearly denotes a power metric at a half chip early time and Mlate is power metric at a half chip late time.

That is, the rake processing unit 133 may calculate the information on a timing position based on a ratio of the difference between the power metric at a half chip early time and the power metric at a half chip late time to the power metric sampled on time, and then transfers the information on a timing position to the beta (β) processing unit 135-4.

The configuration of the rake processing unit 133 which is shown in FIG. 4 is merely exemplary, and, if an additional timing tracker exists, the configuration of the rake processing unit 133 may not be the same as in FIG. 4.

Referring back to FIG. 3, when acquiring the information on a timing position from the rake processing unit 133, the beta (β) processing unit 135-4 obtains a beta (β) value which matches the information on a timing position. The beta (β) processing unit 135-4 compensates for a frequency offset obtained from the phase-to-to frequency converter 135-2, by adding the beta (β) value to the frequency offset.

The alpha (α) processing unit 135-8 multiplies an alpha (α) value, which is a scaling factor, for the frequency offset compensation. The adder 135-8 adds up an output from the delay unit (Z-1) 135-9 and an output from the alpha (α) processing unit 135-8, and outputs the result to the oscillator 132.

As such, the AFC controls the oscillator 132 to reduce a timing offset so that degradation of performance by the timing offset may be minimized.

Figure 5:
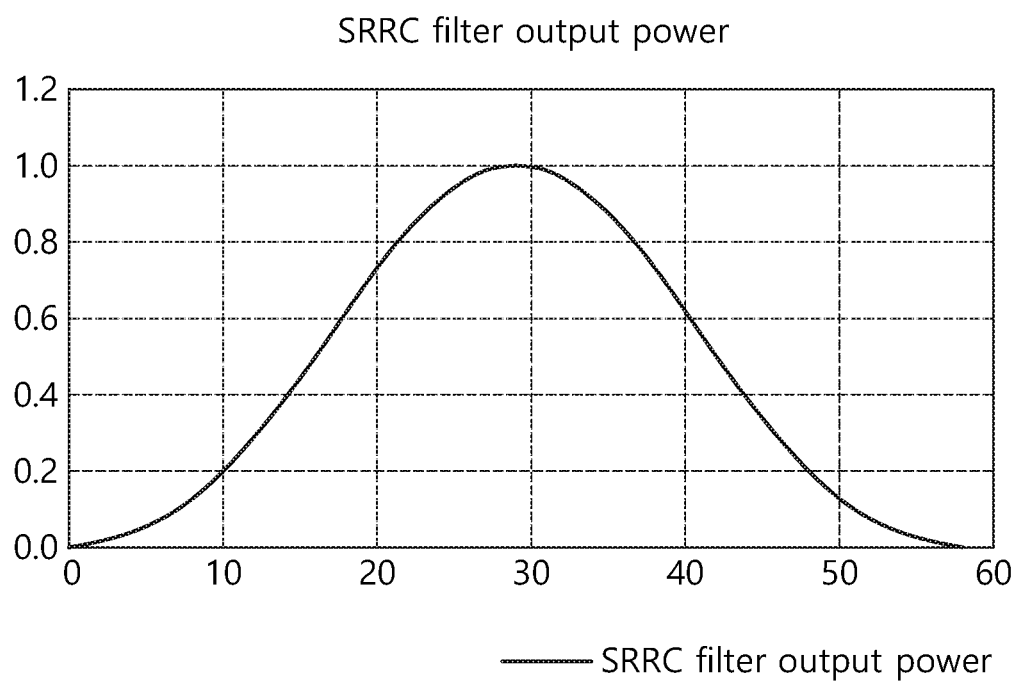
FIG. 5 is example of an output of a filter shown in FIG. 4.

FIG. 5 is an example of an output of a filter shown in FIG. 4.

If the matching filter 133-3 shown in FIG. 4 utilizes a square root raised cosine (SRRC) filter, the output power of the matching filter 133-3 may be the same as shown in FIG. 5. In FIG. 5, the X-axis represents chip sections, and each section unit is 1/64 chip. A timing offset value and a value of MEL_Diff/MOntime are mapped on a 1:1 basis, and the value of MEL_Diff/MOntime with respect to a specific timing offset is shown in the following Table 1.

For example, if there is no interference and noise and a value of MEL_Diff/MOntime is −0.2038, the current timing position is located up to 1/16 chip earlier than a position indicating the maximum SNR. Thus, if sampling is performed to reduce a sampling clock frequency, the timing position may move backward.

Therefore, the beta (β) processing unit 135-4 may obtain a beta (β) value according to the following equation.

$$\beta = x \times \frac{M_{EL\_diff}}{M_{Ontime}} \quad \text{[Equation 2]}$$

In the above equation, an value of x is a constant which is used to determine a speed for movement to a timing position indicating the maximum SNR.

TABLE 1

| Sample Offset | SRRC Output Power |
|---|---|
| 0 | 1 |
| 1/32 | 0.9967 |
| 2/32 | 0.9869 |
| 3/32 | 0.9707 |
| 4/32 | 0.9483 |
| 5/32 | 0.9202 |
| 6/32 | 0.8868 |
| 7/32 | 0.8486 |
| 8/32 | 0.8061 |
| 9/32 | 0.7601 |
| 10/32 | 0.7111 |
| 11/32 | 0.6600 |
| 12/32 | 0.6074 |

TABLE 1-continued

| Sample Offset | SRRC Output Power |
|---|---|
| 13/32 | 0.5541 |
| 14/32 | 0.5007 |
| 15/32 | 0.4479 |
| 16/32 | 0.3965 |
| 17/32 | 0.3468 |
| 18/32 | 0.2996 |
| 19/32 | 0.2552 |
| 20/32 | 0.2139 |
| 21/32 | 0.1762 |
| 22/32 | 0.1422 |
| 23/32 | 0.1120 |
| 24/32 | 0.0857 |
| 25/32 | 0.0633 |
| 26/32 | 0.0447 |
| 27/32 | 0.0297 |
| 28/32 | 0.0181 |
| 29/32 | 0.0097 |
| 30/32 | 0.0041 |
| 31/32 | 0.0010 |

TABLE 2

| | Ratio Between $M_{EL\_Diff}/M_{Ontime}$ | | | | | | | |
|---|---|---|---|---|---|---|---|---|
| Timing Offset | 1/16 Chip Early | 1/16 Chip Late | 1/8 Chip Early | 1/18 Chip Late | 1/4 Chip Early | 1/4 Chip Late | 1/2 Chip Early | 1/2 Chip Late |
| Ratio | −0.2038 | 0.2038 | −0.4150 | 0.4150 | −0.8937 | 0.8937 | −2.5221 | 2.5221 |

Meanwhile, to determine a value of x used in the above Equation 1, it is necessary to consider the following.

Even though an actual frequency offset value is 0, a frequency offset may be measured as if the frequency offset exists. It is because auto correlation properties of a scrambling code are different and inter-carrier interference (ICI) may affect a measurement of a frequency offset. In a case where an offset is located before a location of the maximum SNR, a positive (+) frequency offset or a negative (−) frequency offset may be measured according to a scrambling code. In the former case, the AFC 135 performs a control operation to reduce a sampling clock frequency so that the offset may be moved to a timing position indicating the maximum SNR. However, in the latter case, the offset is moved to be far from the timing position indicating the maximum SNR. Thus, a value of x should be set to be greater than the maximum value, in which a frequency offset occurs, in a direction going far from a timing location indicating the maximum SNR. In this manner, it is possible to move to a timing position indicating the maximum SNR with respect to every scrambling code.

For example, in a case where a frequency offset is 0 in 3.84 Mcps WCDMA system, if a frequency offset of 20 Hz is measured in response to occurrence of a timing offset of ⅛ chip according to autocorrelation properties of a scrambling code, $$\left| x \times \frac{M_{EL\_diff}}{M_{Ontime}} \right| > 20,$$

wherein a value of the constant x is greater than 48.2 because a value of MEL_diff/MOntime is 0.4150 when an offset is ⅛ chip. That is, if a value of the constant x is set to be greater than 48.2 in the above example, a timing position is moved by the oscillator 132 to an on-time position.

The above-described embodiments of the present invention may be implemented with various means. For example, the embodiments of the present invention may be implemented by hardware, firmware, software, or a combination thereof. Specific descriptions thereof is provided with reference to drawings.

Figure 6:
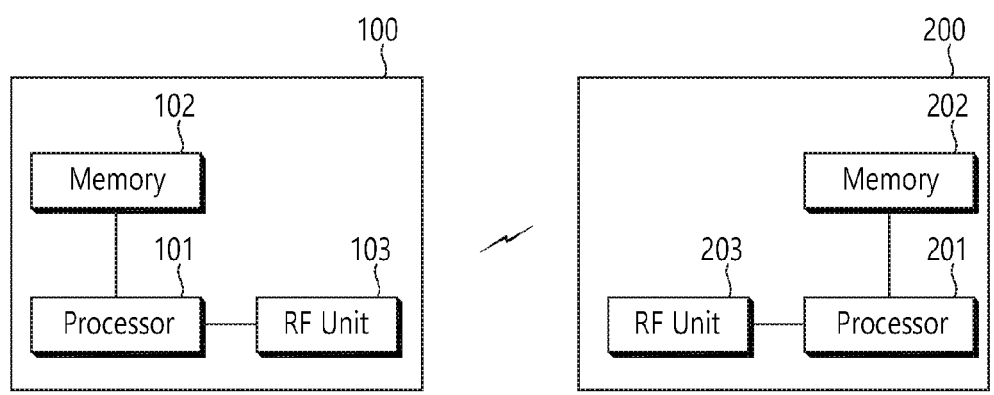
FIG. 6 is a block diagram illustrating a wireless communication system in which an embodiment of the present invention is implemented.

FIG. 6 is a block diagram illustrating a wireless communication system in which an embodiment of the present invention is implemented.

A base station 200 includes a processor 210, a memory 220, and an RF unit 230. The memory 220 is connected to the processor 210 to store various types of information necessary for driving the processor 210. The RF unit 230 is connected to the processor 210 to transmit and/or receive a wireless signal. The processor 210 implements the suggested functions, procedures, and/or methods. In the above-described embodiments, operations of a base station may be implemented by the processor 210.

An wireless device 100 includes a processor 110, a memory 120, and an RF unit 130. The memory 120 is connected to the processor 110 to store various types of information necessary for driving the processor 110. The RF unit 130 is connected to the processor 110 to transmit and/or receive a wireless signal. The processor 110 implements the suggested functions, procedures, and/or methods. In the above-described embodiments, operation of a wireless device may be implemented by the processor 110.

The processor may include an application-specific integrated circuit (ASIC), a different chip set, a logic circuit, and a data processing device. The memory may include a read-only memory (ROM), a random access memory (RAM), a flash memory, a memory card, a storage medium, and/or any other storage device. An RF unit may include a baseband circuit for processing a wireless signal. When the embodiment is implemented as software, the aforementioned scheme may be implemented as a module (a procedure, a function, etc.) for performing the aforementioned functions. The module may be stored in the memory and implemented by the processor. The memory may be located inside or outside the processor, or may be connected to the processor through a variety of means.

Regarding the above exemplary system, methods are described as a series of steps or blocks with reference to flow charts, but the present invention is not limited to the steps and a certain step may be implemented at a different order or may be implemented simultaneously with other steps. In addition, it would be understood by those skilled in the art that the invention is not limited to the steps shown in the flowchart and that an additional step may be included or one or more steps may be omitted therefrom without departing from the scope of the present invention.

What is claimed is:

1. A rake receiver comprising:

an oscillator;

a radio frequency integrated circuit (RFIC) configured to process analog signals, which are received after experiencing multipath propagation, according to a sampling clock and a carrier frequency clock of the oscillator;

a rake processing unit configured to allocate a finger for each path of signals output from the RFIC, perform decoding, and output information on a timing position through time-tracking, a power metric sampled on time, and a difference between a power metric at a half chip early-time and a power metric at a half chip late-time; and an auto frequency controller (AFC) configured to calculate a beta (β) value for adjusting the sampling clock of the oscillator according to a ratio of the difference between the power metric at the half chip early-time and the power metric at the half chip late-time to the power metric sampled on time.

2. The rake receiver of claim 1, wherein the beta (β) value is calculated by $$\beta = x \times \frac{M_{EL\_diff}}{M_{Ontime}},$$

wherein Montime is a power metric sampled on time, MEL_diff is the difference between the power metric at the half chip early-time and the power metric at the half chip late-time, and x denotes is a constant for adjusting speeds.

3. The rake receiver of claim 2, the beta (β) value is determined by a timing offset according to $$\frac{M_{EL\_diff}}{M_{Ontime}},$$

wherein the timing offset is defined as in the following table

| | $M_{EL\_Diff}/M_{Ontime}$ ratio | | | | | | | |
|---|---|---|---|---|---|---|---|---|
| Timing Offset | 1/16 Chip Early | 1/16 Chip Late | 1/8 Chip Early | 1/18 Chip Late | 1/4 Chip Early | 1/4 Chip Late | 1/2 Chip Early | 1/2 Chip Late |
| Ratio | −0.2038 | 0.2038 | −0.4150 | 0.4150 | −0.8937 | 0.8937 | −2.5221 | 2.5221. |

4. The rake receiver of claim 2, wherein the beta (β) value for adjusting the sampling clock of the oscillator is determined so that sampling is performed at an on-time position which is a time position indicating a maximum signal-to-noise ratio (SNR).

5. The rake receiver of claim 4, wherein the AFC sets the value of x to be greater when a frequency offset is measured to be negative (0) due to a timing offset, despite a real frequency offset of 0, because auto-correlation properties are changed according to a scrambling code.

6. A receiving method of a rake receiver, comprising:

processing analog signals, which are received after experiencing multipath propagation, according to a sampling clock and a carrier frequency clock of an oscillator;

outputting information on a timing position through time tracking based on of the signals, a power metric sampled on time, and a difference between a power metric at a half chip early-time and a power metric at a half chip late-time;

calculating a beta (β) value based on a ratio of the difference of the power metric at a half-time early time and the power metric at a half-time late time to the power metric sampled at on time; and adjusting the sampling clock of the oscillator based on the beta (β) value.

7. The receiving method of claim 6, wherein the beta (β) value is calculated by $$\beta = x \times \frac{M_{EL\_diff}}{M_{Ontime}},$$

wherein Montime is the power metric sampled on time, MEL_diff is the difference between the power metric at the half chip early-time and the power metric at the half chip late-time, and x is a constant for adjusting speeds.

8. The receiving method of claim 7, wherein the beta (β) value is determined by a timing offset according to $$\frac{M_{EL\_diff}}{M_{Ontime}},$$

wherein the timing offset is defined as in the following table:

| | $M_{ELDiff}/M_{Ontime}$ ratio | | | | | | | |
|---|---|---|---|---|---|---|---|---|
| Timing Offset | 1/16 Chip Early | 1/16 Chip Late | 1/8 Chip Early | 1/18 Chip Late | 1/4 Chip Early | 1/4 Chip Late | 1/2 Chip Early | 1/2 Chip Late |
| Ratio | −0.2038 | 0.2038 | −0.4150 | 0.4150 | −0.8937 | 0.8937 | −2.5221 | 2.5221. |

9. The receiving method of claim 7, wherein the beta (β) value for adjusting the sampling clock of the oscillator is determined so that sampling is performed at an on-time position which is a timing position indicating a maximum signal-to-noise ratio (SNR).

10. The receiving method of claim 9, wherein a value of x is set to be greater when a frequency offset is measured to be negative (0) due to a timing offset, despite of a real frequency offset of 0, because autocorrelation properties are changed according to a scrambling code.

* * * * *